(12) United States Patent
Russell et al.

(10) Patent No.: US 8,967,438 B2
(45) Date of Patent: Mar. 3, 2015

(54) JOB BOX

(71) Applicant: Suncast Technologies, LLC, Palm Beach Gardens, FL (US)

(72) Inventors: Brian James Russell, Aurora, IL (US); Michael Thuma, La Grange, IL (US); Michael R. Vogler, Oswego, IL (US); Torrence Anderson, Overland Park, KS (US)

(73) Assignee: Suncast Technologies, LLC, Palm Beach Gardens, FL (US)

( * ) Notice: Subject to any disclaimer, the term of this patent is extended or adjusted under 35 U.S.C. 154(b) by 0 days.

(21) Appl. No.: 14/214,419

(22) Filed: Mar. 14, 2014

(65) Prior Publication Data

US 2014/0265197 A1 Sep. 18, 2014

Related U.S. Application Data

(60) Provisional application No. 61/800,239, filed on Mar. 15, 2013.

(51) Int. Cl.
*B60R 7/00* (2006.01)
*B25H 3/02* (2006.01)
*B62B 3/10* (2006.01)

(52) U.S. Cl.
CPC ... *B25H 3/02* (2013.01); *B62B 3/10* (2013.01)
USPC .......................................... 224/404; 280/79.3

(58) Field of Classification Search
USPC .............. 296/37.6, 146.1, 152; 224/404, 403; 174/153 G; 206/702; 439/501; 280/79.3
See application file for complete search history.

(56) References Cited

U.S. PATENT DOCUMENTS

| | | | | |
|---|---|---|---|---|
| 3,522,955 A | * | 8/1970 | Warner, Jr. | 280/655.1 |
| 4,967,944 A | * | 11/1990 | Waters | 224/404 |
| 5,080,250 A | * | 1/1992 | Dickinson et al. | 220/830 |

* cited by examiner

*Primary Examiner* — John Walters
*Assistant Examiner* — James Triggs
(74) *Attorney, Agent, or Firm* — McHale & Slavin P.A.

(57) ABSTRACT

Briefly, the invention involves a transportable storage box, e.g. job box, for heavy duty applications. The job box provides an indoor or outdoor storage enclosure for homeowners and professionals to keep tools, sports equipment or other items clean and dry. The job box is constructed for stackable cooperation with like constructed job boxes. The job box includes rigid metal handles at each end for increased weight capacity and is sized to fit between the wheel wells in the bed of a pickup truck.

16 Claims, 9 Drawing Sheets

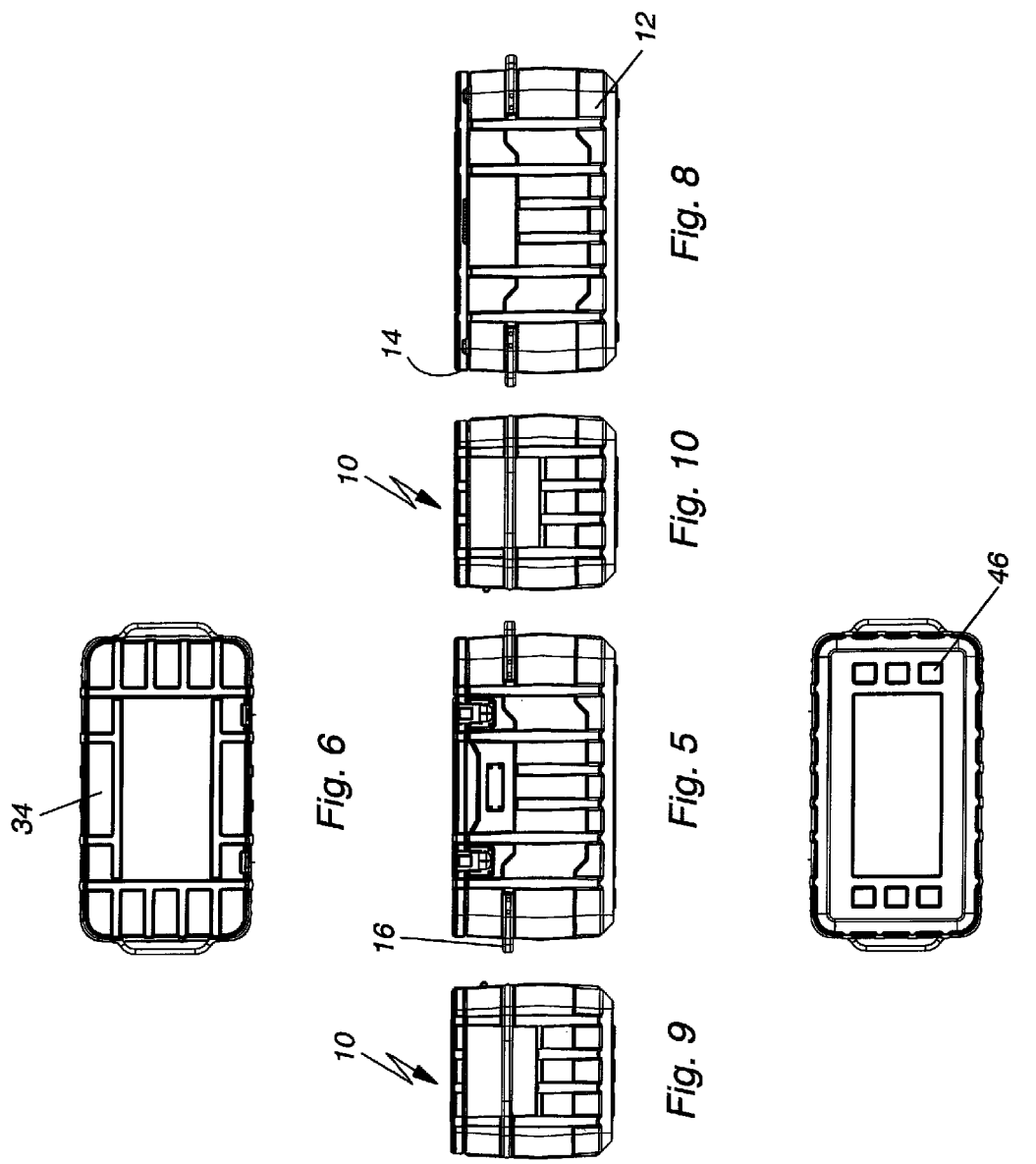

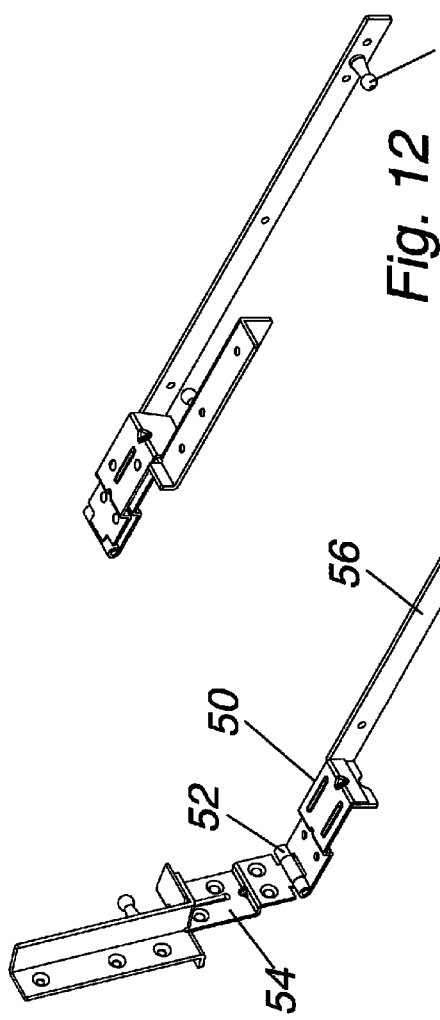
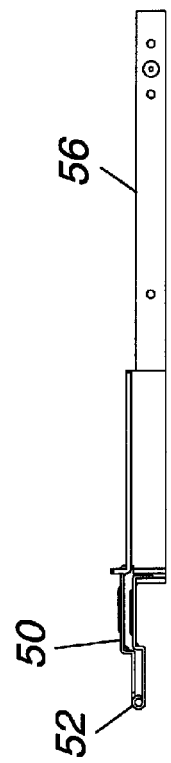
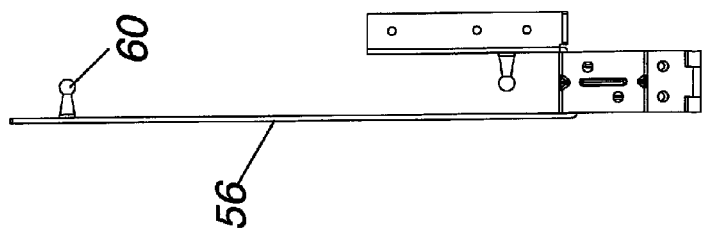
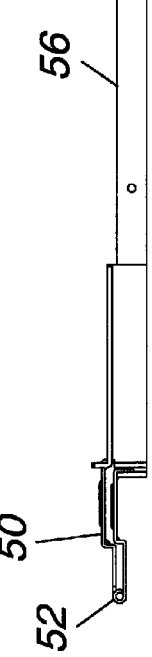

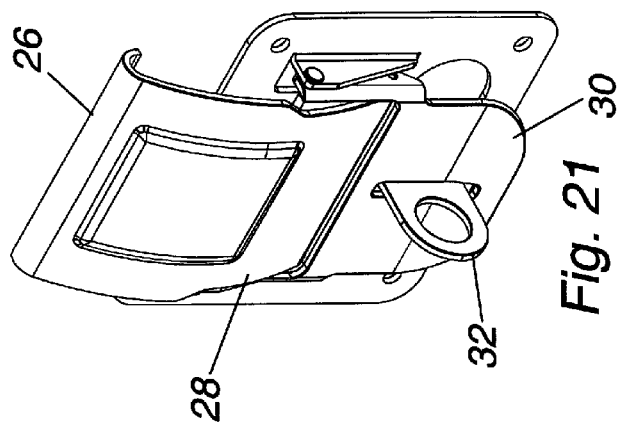
Fig. 21
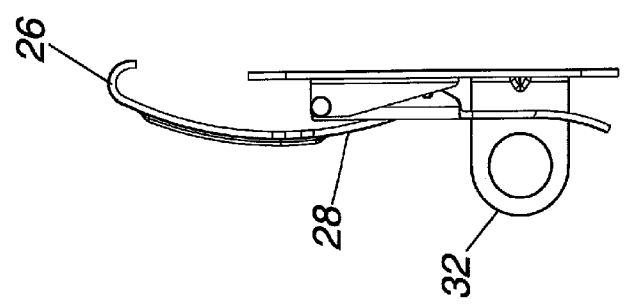
Fig. 24
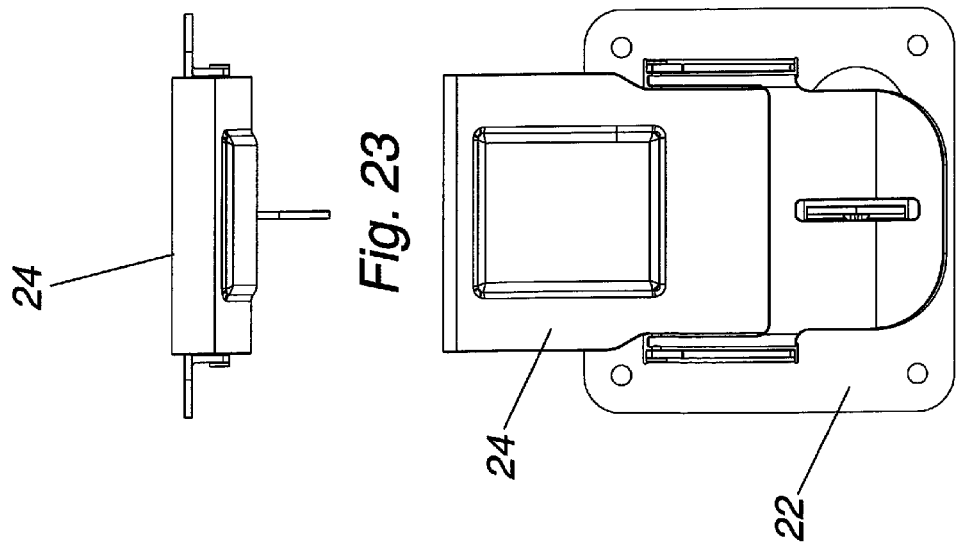
Fig. 23
Fig. 22

US 8,967,438 B2

JOB BOX

RELATED APPLICATIONS

In accordance with 37 C.F.R 1.76, a claim of priority is included in an Application Data Sheet filed concurrently herewith. Accordingly, the present invention claims priority to U.S. Provisional Patent Application No. 61/800,239, filed Mar. 15, 2013, entitled, "Job Box", the contents of the above referenced application are herein incorporated by reference in its entirety.

FIELD OF INVENTION

The present invention generally relates to containers; and more particularly to a transportable storage box for heavy duty applications.

SUMMARY OF THE INVENTION

Briefly, the invention involves a transportable storage box, e.g. job box, for heavy duty applications. The job box provides an indoor or outdoor storage enclosure for homeowners and professionals to keep tools, sports equipment or other items clean and dry. The job box is constructed for stackable cooperation with like constructed job boxes. The job box includes rigid metal handles at each end for increased weight capacity and is sized to fit between the wheel wells in the bed of a pickup truck. The job box is constructed and arranged to cooperate with a caster unit for easy rolling transportation.

Accordingly, it is an objective of the present invention to provide a job box for homeowners and professionals.

It is a further objective of the present invention to provide a job box having two gas springs for lifting the lid.

It is yet a further objective of the present invention to provide a job box having draw latches to hold the lid securely in place.

It is another objective of the instant invention to provide a plastic basin that includes metal supports attached at the front, back and sides of the basin, as well as the front of the lid for added support.

It is yet another objective of the present invention to provide a job box that is stackable and fits between the wheel wells of a pickup truck.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE FIGURES

FIG. 5 is a front view thereof;

FIG. 6 is a top view thereof;

FIG. 7 is a bottom view thereof;

FIG. 8 is a rear view thereof;

FIG. 9 is a left side view thereof;

FIG. 10 is a right side view thereof;

FIG. 11 is a perspective view of a hinge assembly suitable for use with the present invention, illustrated in an open position;

FIG. 12 is a perspective view of a hinge assembly suitable for use with the present invention, illustrated in a closed position;

FIG. 13 is a top view of the hinge assembly illustrated in FIG. 11;

FIG. 14 is a top view of the hinge assembly illustrated in FIG. 11;

FIG. 15 is a rear view of the hinge assembly illustrated in FIG. 11;

FIG. 21 is a perspective view of a latch assembly suitable for use with the present invention;

FIG. 22 is a front view of a latch assembly suitable for use with the present invention;

FIG. 23 is a top view of a latch assembly suitable for use with the present invention;

FIG. 24 is a side view of a latch assembly suitable for use with the present invention;

DETAILED DESCRIPTION OF THE PREFERRED EMBODIMENTS

Figure 1:
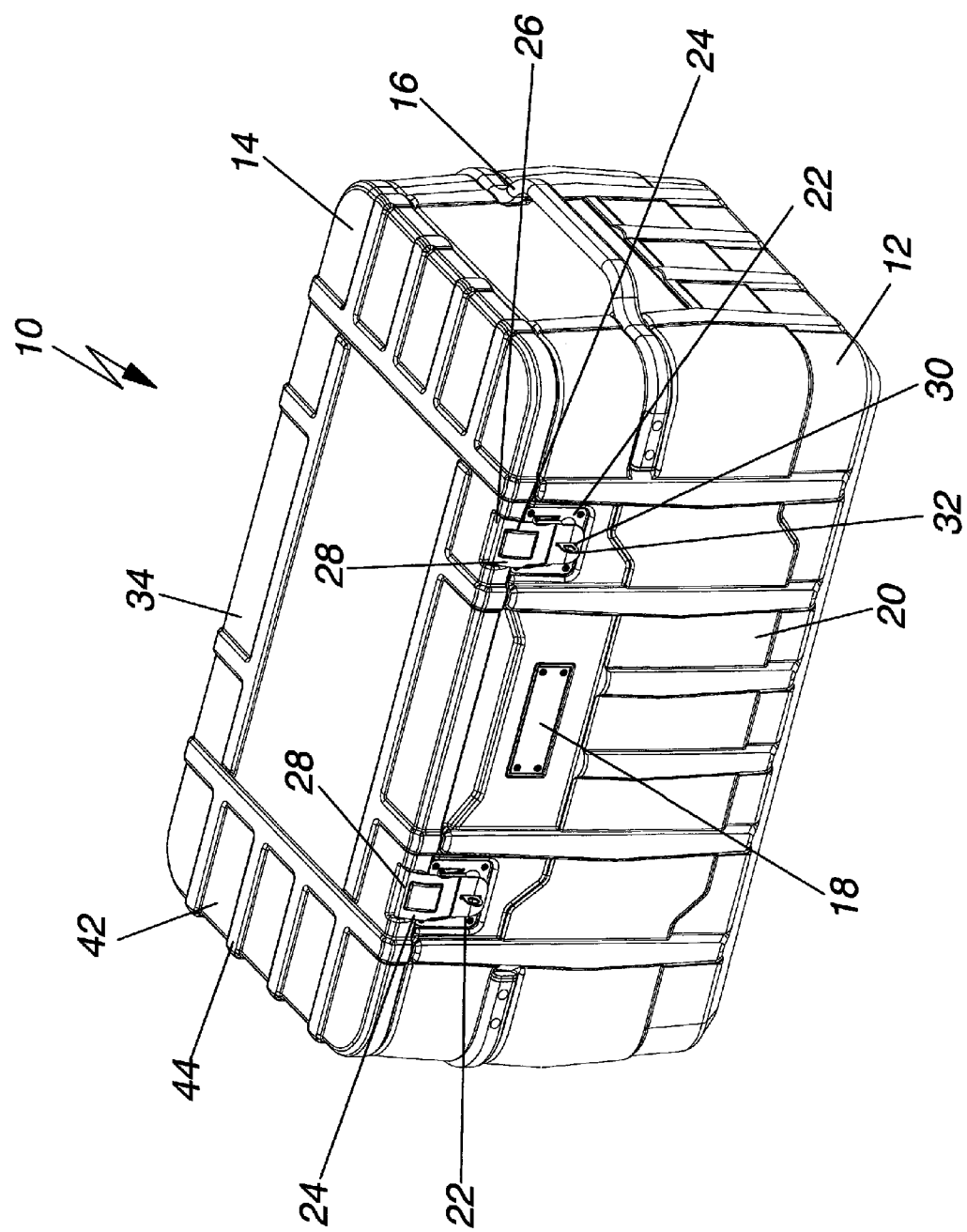
FIG. 1 is a top perspective view of one embodiment of the instant invention.
Figure 2:
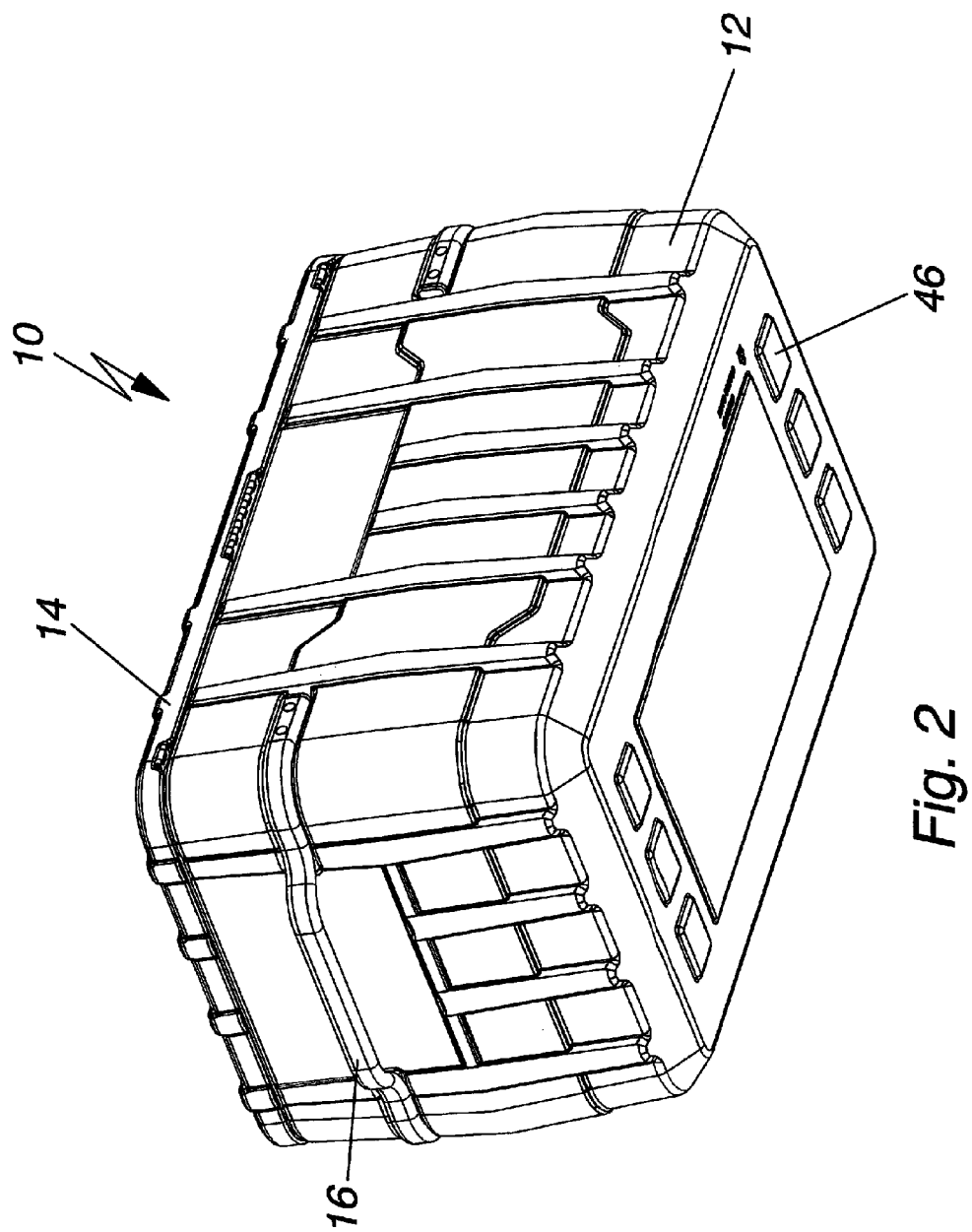
FIG. 2 is a bottom rear perspective view of the embodiment shown in FIG. 1.
Figure 3:
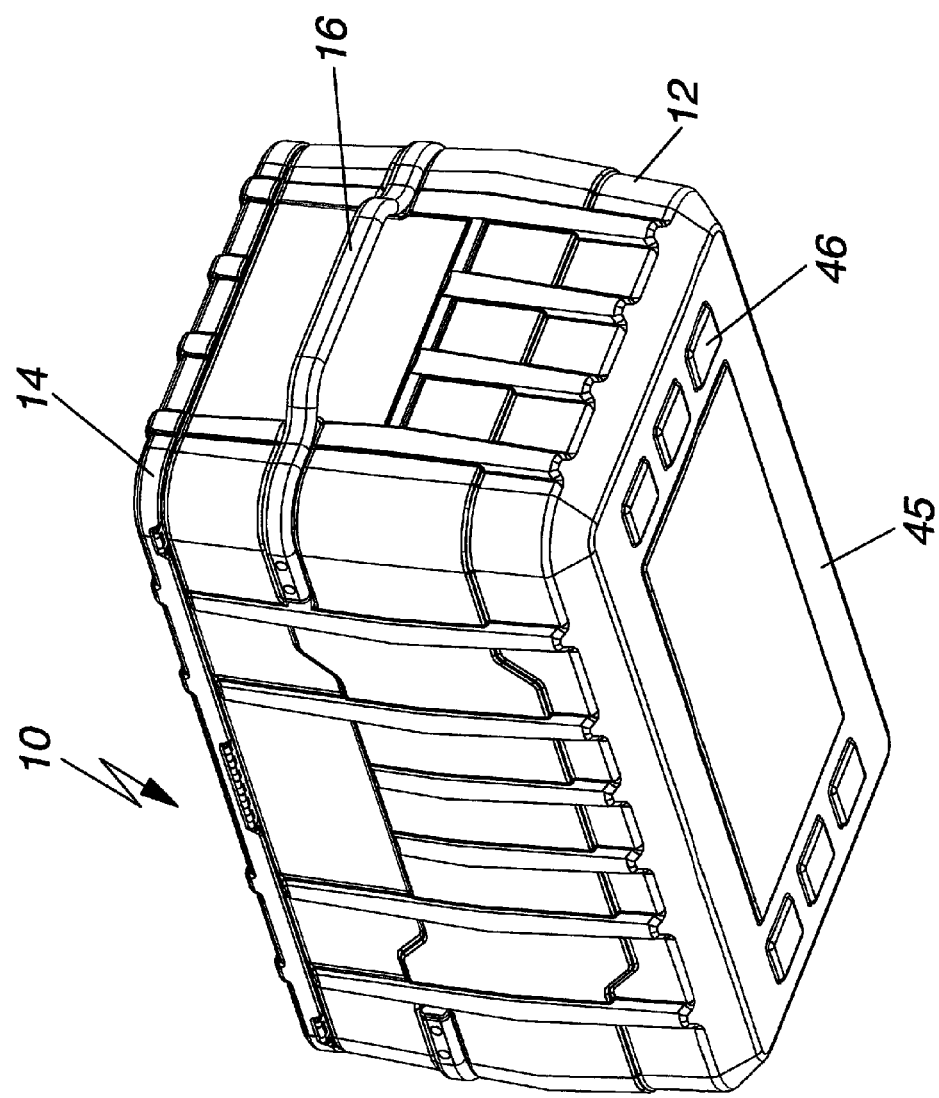
FIG. 3 is a bottom rear perspective view of the embodiment shown in FIG. 1.
Figure 4:
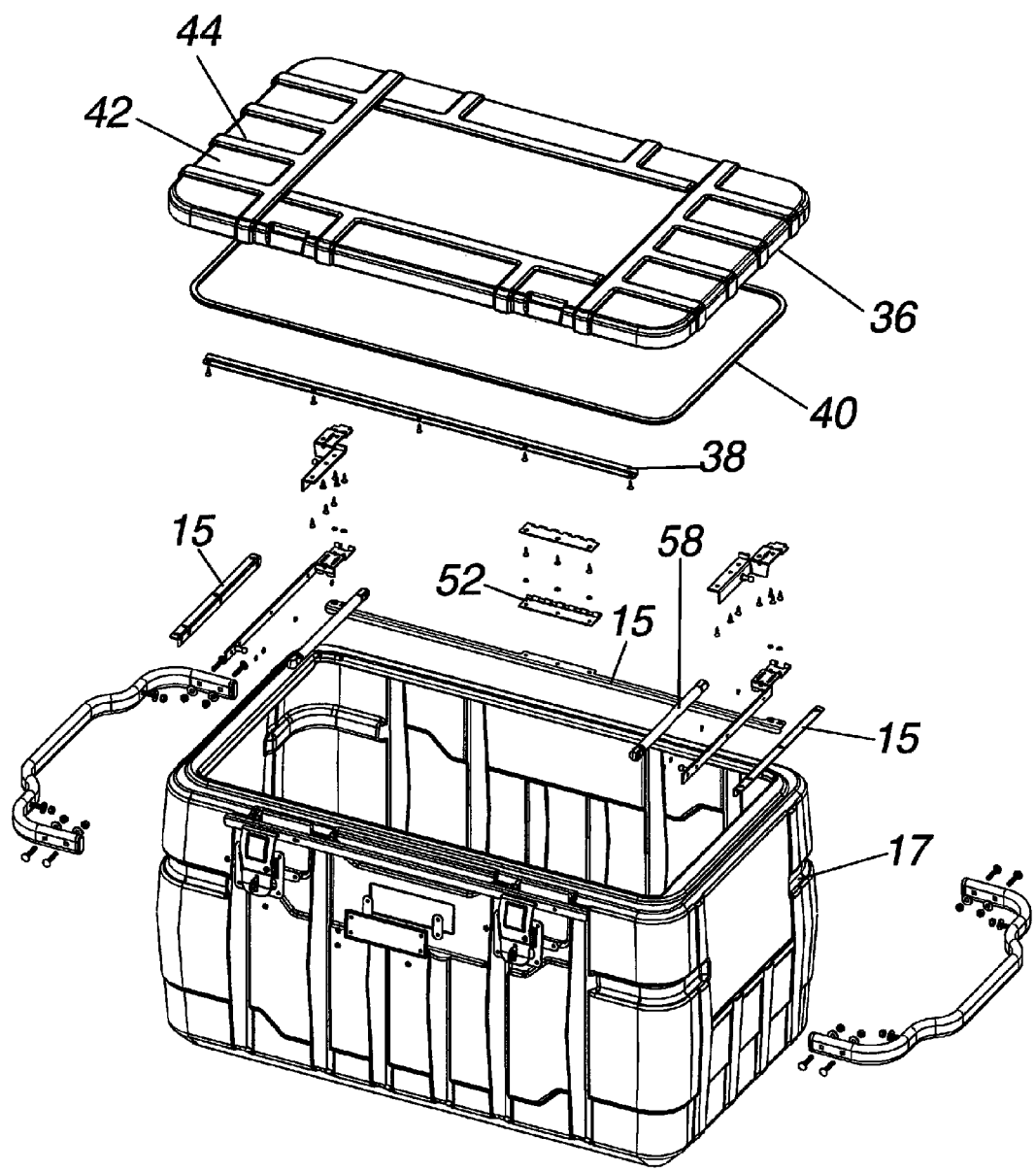
FIG. 4 is an exploded perspective view of the embodiment shown in FIG. 1.
Figure 16:
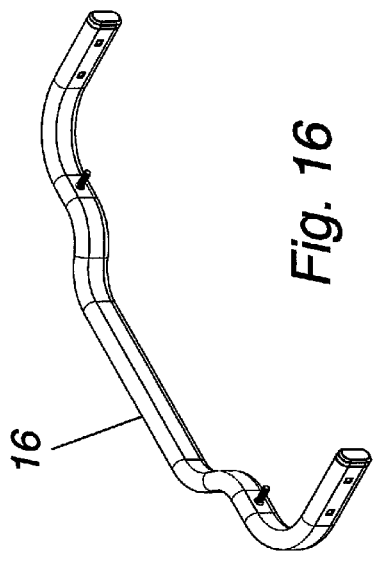
FIG. 16 is a perspective view of a handle assembly suitable for use with the present invention.
Figure 17:
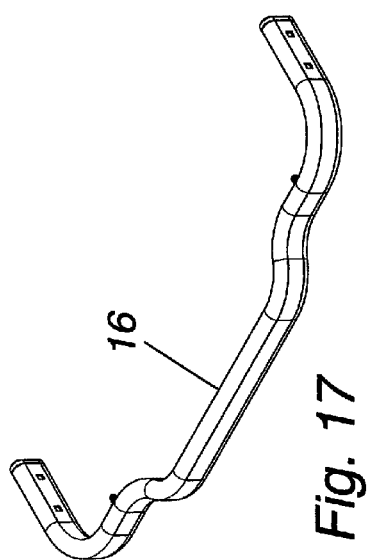
FIG. 17 is a perspective view of a handle assembly suitable for use with the present invention.
Figure 18:
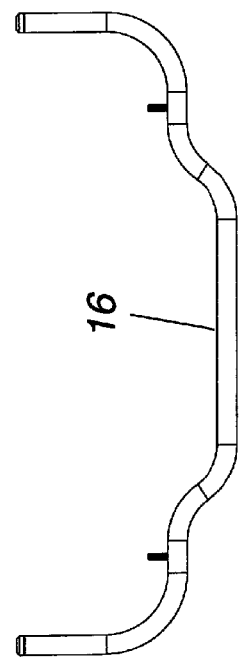
FIG. 18 is a top view of a handle assembly suitable for use with the present invention.
Figure 19:
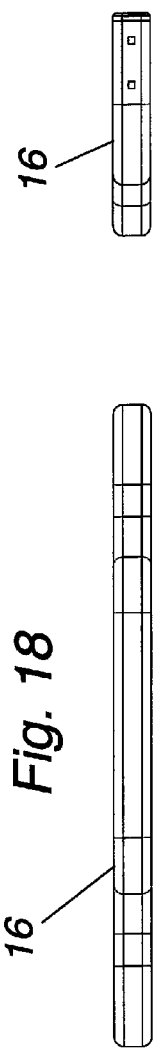
FIG. 19 is a front view of a handle assembly suitable for use with the present invention.
Figure 20:
FIG. 20 is an end view of a handle assembly suitable for use with the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Referring generally to FIGS. 1-24, a job box 10 for storage of tools, garden equipment, sports equipment or other items is illustrated. The job box includes a basin portion 12 and a lid portion 14 both constructed by a blow molding process to include metal strengtheners 15 positioned at the front, rear and sides of the basin. The metal strengtheners increase the rigidity of the basin while also increasing its durability. Positioned on each distal end of the basin portion 12 is a contoured tubular metal handle member 16. The handle member 16 is secured within a channel 17 that extends around the end of the basin to the front and rear surfaces. This construction adds weight capacity to the job box; by securing the handle in the channel, it also allows larger loads to be lifted in the box without breaking the handle off of the basin. The tubular handle may also be coated with plastic or rubber material to resist corrosion and increase the grip for users. A placard 18 is provided on the front panel 20. The placard may be used for manufacturer's name or for personalization. The first portion 22 of a draw latch 24 is secured to the basin portion 12 at a position close to its upper surface. The first portion 22 of the draw latch includes a catch member 26 constructed and arranged to cooperate with latch 28 which is formed integrally to the lid member. The handle portion of the latch also includes an aperture 30 shaped and positioned to cooperate with a hasp 32 for locking the job box with a padlock or the like. The lid member 14 is sized to cooperate with the basin portion for enclosing the basin. The lid is also formed by the process of blow molding to include an inner and an outer wall. The inner and outer walls are formed as one continuous piece of plastic by the process of blow molding. The inner surface 36 of the lid member may also include a metal strengthener 38 secured thereto by fasteners or the like. The inner surface 36 of the lid member also includes a groove (not shown) sized for attachment of a rubber seal 40 for creating a watertight seal between the lid and the basin. The top surface 34 of the lid member is constructed to include pockets 42 separated by ribs 44. The pockets are sized and shaped to cooperate with pads 46 (FIG. 7) that are sized and shaped to fit into the pockets 42 to allow stable stacking of multiple job boxes.

Referring to FIGS. 4 and 11-15, a pair of side hinge assemblies 50 and a central hinge 52 are provided to allow the lid member to be pivoted with respect to the basin. The side hinge assemblies include a first portion 54 for securement to the inner surface 36 of the lid 14 and a second portion 56 for securement to the basin. The construction of the side hinges provide structure to the basin and may include gas cylinders 58 which extend between the first and second portions of the side hinges to hold the lid in an open position when desired. Spherical swivels 60 are provided for securing the gas cylinders to the hinge components.

Figure 25:
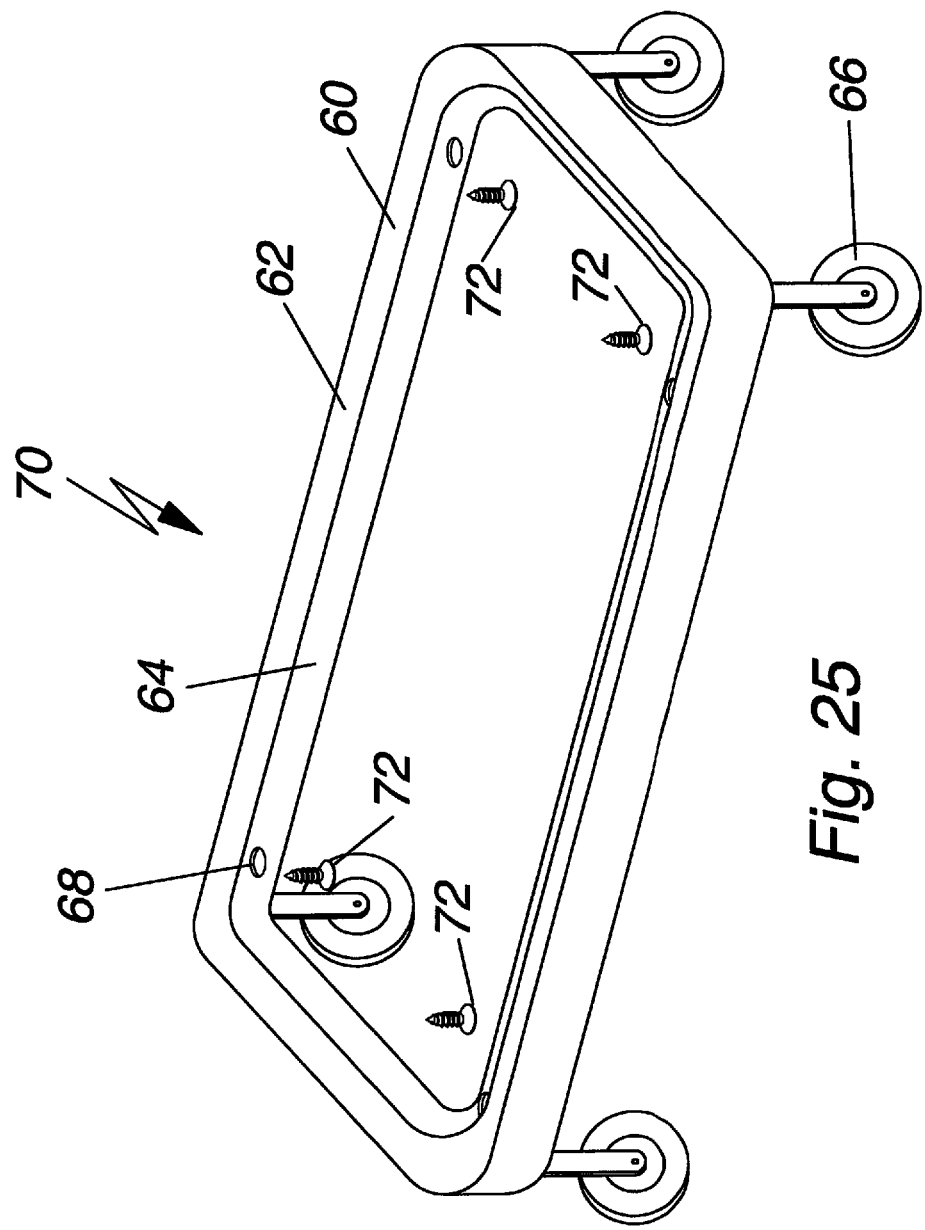
FIG. 25 is a perspective view of a wheeled frame suitable for use with the present invention.

Referring to FIG. 25, a cart 70 for the job box 10 is illustrated. The cart 70 includes a frame 60 having sidewalls 62 and a base surface 64. In operation, the job box is placed on the cart so the bottom surface 45 of the job box sets on the base surface 64 and the sidewalls 62 maintain the position of the job box to prevent sliding and the like. Casters 66 are provided to allow easy movement of a loaded or unloaded job box. Apertures 68 may be provided to secure the job box to the cart on a permanent or semi-permanent basis. Fasteners, such as but not limited to bolts 72, screws, rivets, snap locks, clips or the like may be utilized to secure the box to the cart.

It is to be understood that while a certain form of the invention is illustrated, it is not to be limited to the specific form or arrangement of parts herein described and shown. It will be apparent to those skilled in the art that various changes may be made without departing from the scope of the invention, and the invention is not to be considered limited to what is shown and described in the specification.

One skilled in the art will readily appreciate that the present invention is well adapted to carry out the objects and obtain the ends and advantages mentioned, as well as those inherent therein. Any compounds, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A job box for storage of equipment comprising:
    a basin member, said basin member including a base panel and four side panels, said base panel and said side panels formed from a single piece of plastic by the process of blow molding to form a hollow box-like structure, a lip portion extending around an upper surface of said four side panels, said lip portion offset inwardly from an outer perimeter of said four side panels;
    a lid member sized to cooperate with said basin member for enclosing said basin member, said lid member including a cover panel, said cover panel including a depending lip extending around the perimeter of said lid panel, an inner surface of said depending lip sized to extend around said lip portion of said basin member said lid member formed by the process of blow molding to include an inner wall and an outer wall, said inner and said outer walls formed as one single continuous piece of plastic material, said cover panel of said lid member constructed to include pockets separated by ribs, said pockets sized and shaped to cooperate with pads formed onto a bottom surface of said base panel, said pads sized and shaped to fit into said pockets to allow stable stacking of multiple job boxes;
    at least one hinge assembly secured to said basin member and said lid member for pivotally securing said lid member to said basin member;
    at least one latch assembly secured to said basin member on a side opposing said at least one hinge assembly for securing said lid member in a closed position with respect to said basin member.

2. The job box of claim 1 wherein said lid member includes at least one metal strengthener secured thereto by fasteners.

3. The job box of claim 1 wherein said inner wall of said lid member includes a groove sized for securing a rubber seal therein for creating a watertight seal between the lid and the basin.

4. The job box of claim 1 wherein said basin member includes a metal strengthener secured to at least one of said four side panels to increase the rigidity of said basin member.

5. The job box of claim 4 wherein a front, a rear and two opposing side panels each include a metal strengthener secured thereto.

6. The job box of claim 1 wherein said four side panels include a front panel, a rear panel, a right end panel and a left end panel, each of said right end panel and said left end panel including a tubular handle member.

7. The job box of claim 6 wherein each said tubular handle member is set into a channel formed into said right and said left end panels.

8. The job box of claim 7 wherein said tubular handle member extends along the entire length of said right and said left end panels and around the end of said basin member so that said tubular handle members extend along a portion of said front and said rear panels.

9. The job box of claim 1 wherein said at least one latch assembly is a draw latch, said draw latch secured to the basin portion at a position close to its upper surface, said draw latch including a catch member constructed and arranged to cooperate with a latch which is formed integrally to said lid member.

10. The job box of claim 1 wherein said latch assembly includes a handle portion, said handle portion including an aperture positioned to cooperate with a hasp for locking said lid member into a closed position with a padlock.

11. The job box of claim 1 wherein said at least one hinge assembly includes a pair of side hinge assemblies and a central hinge to allow the lid member to be pivoted with respect to said basin member.

12. The job box of claim 11 wherein said side hinge assemblies provide structure to said basin assembly and include gas cylinders which extend between a first and a second portion of said side hinges for selectively holding said lid member in an open position.

13. The job box of claim 1 including a cart for use in transporting said job box, said cart including a frame having sidewalls, a base surface and a bottom surface, said bottom surface including a plurality of casters secured thereto.

14. The job box of claim 13 wherein said frame includes a plurality of apertures extending therethrough, said apertures positioned to allow fasteners to be utilized to secure said cart to said base panel of said basin member.

15. A job box for storage of equipment comprising:
a basin member, said basin member including a base panel and four side panels, said base panel and said side panels formed from a single piece of plastic by the process of blow molding to form a hollow box-like structure, a lip portion extending around an upper surface of said four side panels, said lip portion offset inwardly from an outer perimeter of said four side panels, said four side panels include a front panel, a rear panel, a right end panel and a left end panel, each of said right end panel and said left end panel including a tubular handle member, each said tubular handle member set into a channel formed into said right and said left end panels, said tubular handle member extending along the entire length of said right and said left end panels and around the end of said basin member so that said tubular handle members extend along a portion of said front and said rear panels;
a lid member sized to cooperate with said basin member for enclosing said basin member, said lid member including a cover panel, said cover panel including a depending lip extending around the perimeter of said lid panel, an inner surface of said depending lip sized to extend around said lip portion of said basin member;
at least one hinge assembly secured to said basin member and said lid member for pivotally securing said lid member to said basin member;
at least one latch assembly secured to said basin member on a side opposing said at least one hinge assembly for securing said lid member in a closed position with respect to said basin member.

16. A job box for storage of equipment comprising:
a basin member, said basin member including a base panel and four side panels, said base panel and said side panels formed from a single piece of plastic by the process of blow molding to form a hollow box-like structure, a lip portion extending around an upper surface of said four side panels, said lip portion offset inwardly from an outer perimeter of said four side panels;
a lid member sized to cooperate with said basin member for enclosing said basin member, said lid member including a cover panel, said cover panel including a depending lip extending around the perimeter of said lid panel, an inner surface of said depending lip sized to extend around said lip portion of said basin member;
at least one hinge assembly secured to said basin member and said lid member for pivotally securing said lid member to said basin member, said at least one hinge assembly includes a pair of side hinge assemblies and a central hinge to allow the lid member to be pivoted with respect to said basin member, said side hinge assemblies providing structure to said basin assembly and include gas cylinders which extend between a first and a second portion of said side hinges for selectively holding said lid member in an open position;
at least one latch assembly secured to said basin member on a side opposing said at least one hinge assembly for securing said lid member in a closed position with respect to said basin member.

* * * * *